United States Patent [19]

Liautaud

[11] 4,264,675

[45] Apr. 28, 1981

[54] HIGH TOLERANCE COIL ASSEMBLY

[76] Inventor: James P. Liautaud, River and Bluff Rds., Cary, Ill. 60013

[21] Appl. No.: 95,233

[22] Filed: Nov. 19, 1979

Related U.S. Application Data

[62] Division of Ser. No. 868,995, Jan. 12, 1978, Pat. No. 4,193,185.

[51] Int. Cl.$^3$ ........................ B32B 15/00; D02G 3/00; H01F 41/06

[52] U.S. Cl. .................................... 428/376; 428/377; 428/379

[58] Field of Search ............... 428/364, 371, 377, 379, 428/375, 398, 376, 383, 397, 398; 264/272; 336/65, 136, 198, 205, 208, 192, 107; 29/605, 602 R

[56] References Cited

U.S. PATENT DOCUMENTS

| | | | |
|---|---|---|---|
| 3,281,744 | 10/1966 | Melanson | 336/65 |
| 3,590,329 | 6/1971 | Krepps, Jr. | 29/605 |
| 3,944,182 | 3/1976 | Yanagita et al. | 264/272 |

*Primary Examiner*—Lorraine T. Kendell

*Attorney, Agent, or Firm*—Hill, Van Santen, Steadman, Chiara & Simpson

[57] ABSTRACT

A low cost, high tolerance molded coil is disclosed together with a method of constructing the same. A wound coil is provided with connection leads. A mold having a mold cavity therein for the formation of an integral outer core and for supporting the coil is provided. The mold also produces integral securing portions for securing the coil to the outer core. The wound coil is placed in the mold cavity and a pre-molded and pre-shrunk plastic inner core is positioned inside of the coil substantially along the coil's longitudinal center line. A heated molding plastic is injected into the mold cavity so as to form the integral outer core for supporting the coil and securing portions of the coil. The molded coil is cooled and removed from the mold without withdrawing the inner core from the molded coil, which thereafter remains in the finished product. By use of the pre-molded and pre-shrunk plastic inner core, shrinkage and other deformations of the outer core is prevented. Consequently, the coil inductance is maintained at a high tolerance.

8 Claims, 9 Drawing Figures

HIGH TOLERANCE COIL ASSEMBLY

This is a division of application Ser. No. 868,995, filed Jan. 12, 1978 now U.S. Pat. No. 4,193,185.

BACKGROUND OF THE INVENTION

1. Field of the Invention

This invention relates to molded coils.

2. Description of the Prior Art

It is known from U.S. Pat. No. 3,590,329 to produce an integrally molded coil. Initially a wound coil is positioned within a mold forming member. A metal central core pin is inserted into the mold after closing for forming a hollow center bore of the coil form to be molded. The mold cavity is filled with insulating plastic material for an injection molding process. The metal core is withdrawn from the molded coil after the injection cycle and the mold is opened and the finished coil removed.

When the metal core is withdrawn from the inside of the molded coil following the injection cycle and prior to removing the finished coil from the mold, the molded portion of the coil form shrinks and warps sufficiently to distort the entrapped coil winding and cause electrical variances sufficient to limit its application to low tolerance usage.

SUMMARY OF THE INVENTION

It is an object of this invention to provide a high tolerance coil assembly and a method for producing the same wherein shrinkage of a molded coil form is prevented.

According to the invention, a high tolerance, low cost insert-molded coil is provided which is suitable for high tolerance electrical applications, particularly such as antenna applications used it citizens band radios and the like. According to the invention, a pre-molded and pre-shrunk plastic core is provided around which an outer plastic core is injection molded. The inner plastic core remains in the coil so as to prevent shrinking or other deformations of the coil form which could result in undesirable inductance variations.

According to a method of the invention, a wound coil is positioned within a mold having a mold cavity therein for the formation of an integral outer core for supporting the coil and integral securing portions for fixing various portions of the coil to the outer core. A pre-molded and pre-shrunk plastic inner core is aligned and supported inside of the coil substantially along the coil's longitudinal center line. Thereafter, the mold is closed and a heated molding plastic is injected into the mold cavity for the purpose of forming the integral outer core and integral securing portions. Thereafter, the molded coil is cooled and removed from the mold without withdrawing the inner core from the molded coil.

With the method of the invention, a core is provided which is of sufficient strength so as not to collapse during the outer core molding cycle. By not withdrawing the inner core from the coil, but rather leaving it to become an integral part of the molded coil form, the high degree of shrinkage and warpage that occurs in withdrawing the core is eliminated.

The inner core may be solid or of a two-piece design. The two-piece design permits large cores to be made economically. The inner core may contain an air chamber to provide a lower dielectric as compared to an all solid plastic core. Such a low dielectric core is important in the construction of loading coils for antennas.

DESCRIPTION OF THE PREFERRED EMBODIMENTS

Figure 1:
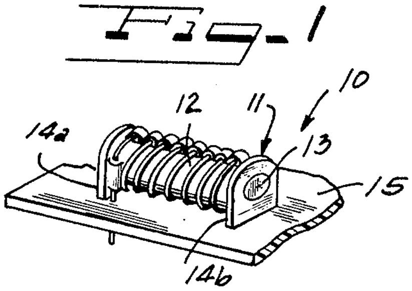
FIG. 1 is a perspective view of a high tolerance insert-molded coil of this invention.

A high tolerance insert-molded coil of the invention is generally shown at 10 in FIG. 1. An insert-molded coil form 11 for the coil consists of an outer core 12 and an inner core 13. Mounting feet **14*a* and 14*b* are provided at either end of the coil form 11 to facilitate mounting on a printed circuit board 15**.

Figure 2:
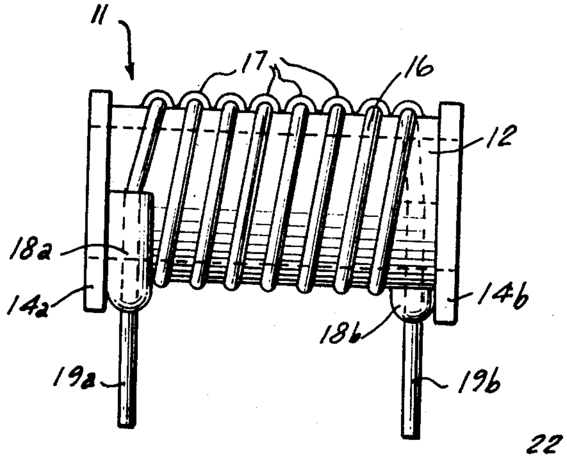
FIG. 2 is a side view of the coil of FIG. 1.

As shown most clearly in FIG. 2, a coil 16 is provided having end connection leads **19*a* and 19*b*. Molded securing portions 17 are provided for maintaining a fixed position of the turns of the coil on the outer core 12. These securing portions are integral with the outer core 12 and are formed simultaneously during the injection-molded process. Similarly, connection lead molded securing portions 18*a* and 18*b*** are also formed as integral moldings during the molding process.

Figure 3:
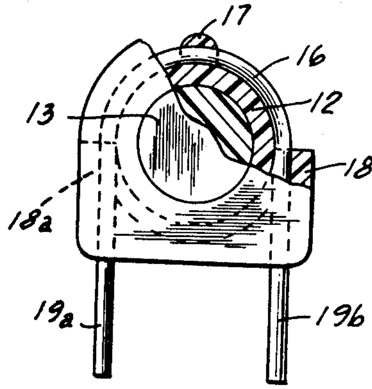
FIG. 3 is an end view with a fragmentary section of the coil of FIG. 1.

The relationship between the inner core 13, outer core 12 and coil 16 is illustrated in FIG. 3, particularly at the fragmentary view shown in the Figure.

Figure 4:
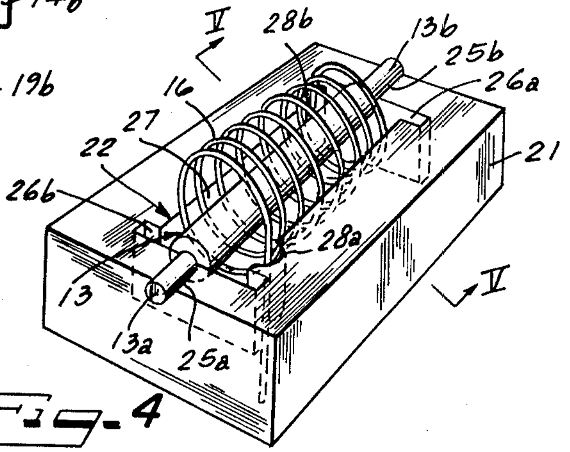
FIG. 4 is a perspective view of a lower mold block used in forming the high tolerance molded coil of this invention.
Figure 5:
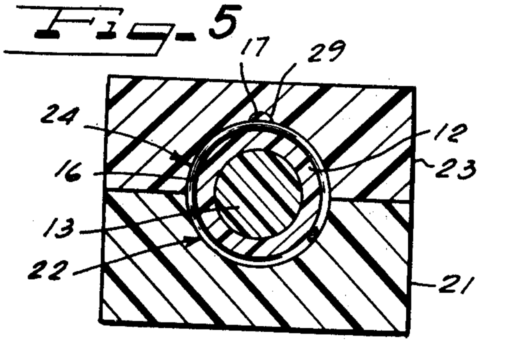
FIG. 5 is a cross-sectional view taken along line V—V of FIG. 4.

The method of producing the high tolerance coil of FIGS. 1 through 3 may be understood by reference to FIGS. 4 and 5. A lower mold block 21 is provided having a lower cavity 22. An upper mold block 23 having an upper cavity 24 mates with the lower mold block 21. Curved narrow supporting apertures **25*a* and 25*b* are provided at opposite ends of the mold so as to support and align the pre-shrunk and pre-molded inner core 13. The inner core 13 is placed onto the lower mold block after the coil 16 has been positioned in the lower cavity 22. Narrow rod-like support extensions 13*a* and 13*b* at ends of the inner core 13 rest in the narrow apertures 25*a* and 25*b* for support of the core 13**. Other convenient means of positioning and supporting the core may also be employed.

The lower cavity 22 includes mounting feet cavity portions **26*a* and 26*b*, a large outer core cavity portion 27 centrally of the mold, and connection lead cavity portions 28*a* and 28*b* extending from the central cavity portion 27 through the lower mold 21. The connection leads 18*a* and 18*b* of the coil 16** are aligned through these cavity portions.

As shown in FIG. 5, the upper mold block 23 has a coil turn positioning cavity portion 29 permits the formation of coil turn position mold securing portions which are integral with the outer molded core 12.

After the inner core 13 has been aligned and positioned, the upper and lower blocks 23 and 21 are mated together. Hot plastic is then injection molded through any convenient aperture into the central cavity formed by the lower and upper cavities 22 and 24. After cooling, the coil is removed from the mold and, if utilized, rod-like extensions 13*a* and 13*b* of the inner core 13 are trimmed off.

Figure 6A:
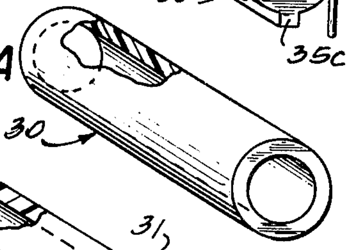
FIGS. 6A and 6B are perspective views of alternate embodiments of an inner core for the molded coil of this invention.
Figure 6B:
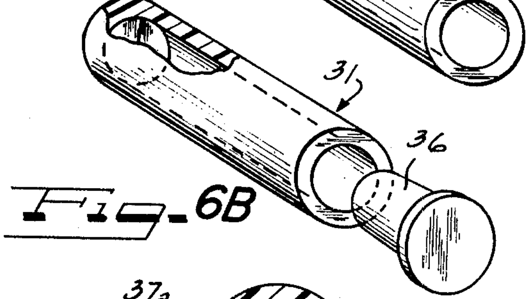
Figure 6C:
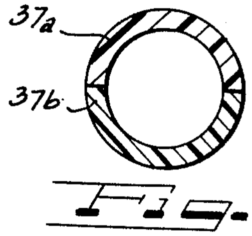
FIG. 6C is an end view of another embodiment of an inner core for the molded coil of this invention.

As shown in FIGS. 6A, 6B and 6C, in other embodiments of the invention the inner core 13 may be provided in hollow fashion as shown at 30, in cup-shaped fashion as shown at 31 together with a mating cap 36, or in segmented form with upper and lower segments 37*a* and 37*b*.

Figure 7:
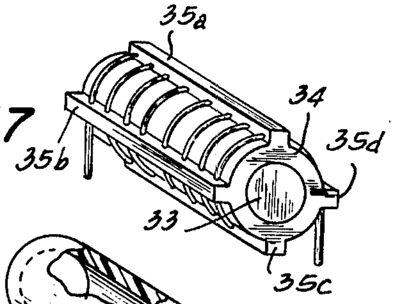
FIG. 7 is a perspective view of an alternate embodiment of the molded coil of this invention.

Referring to FIG. 7, an alternate embodiment of the molded coil is shown wherein the inner core 33 and outer core 34 are provided as above. However, the turn position and connection lead securing members comprise strips 35*a, b, c, d.*

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A low cost high tolerance molded coil, comprising:
   a wound coil having at least first and second connection leads;
   an inner pre-molded, pre-shrunk plastic core;

an outer plastic core molded around the inner pre-molded core, said inner core substantially preventing shrinkage of said outer core, said outer core being positioned within the wound coil and supporting the same; and
   connection lead securing molded portions formed integrally with and of the same material as the outer molded core.

2. The coil of claim 1 in which the inner pre-molded core is hollow.

3. The coil of claim 1 in which the inner pre-molded core has a hollow cup-shaped cavity.

4. The coil of claim 1 containing a mating cap for closing off said cup-shaped cavity.

5. The coil of claim 2 in which coil turn securing molded portions are formed integrally with and of the same material as the outer molded core.

6. The coil of claim 1 in which said coil turn securing molded portions comprise elongated strips running parallel with a longitudinal axis of the coil.

7. The coil of claim 3 in which said core is segmented.

8. A low cost high tolerance molded coil, comprising:
   a wound coil having at least first and second connection leads;
   an inner pre-molded, pre-shrunk plastic core; and
   an outer plastic core molded around the inner pre-molded core, said inner core preventing shrinkage of said outer core, and said outer core being positioned within the wound coil and supporting the same.

* * * * *